United States Patent
Kato et al.

(10) Patent No.: US 7,982,925 B2
(45) Date of Patent: Jul. 19, 2011

(54) SOLID-STATE IMAGE-PICKUP DEVICE AND METHOD OF PROCESSING SIGNAL OF SOLID-STATE IMAGE-PICKUP DEVICE

(75) Inventors: Akihiko Kato, Tokyo (JP); Noriyuki Fukushima, Kanagawa (JP)

(73) Assignee: Sony Corporation, Tokyo (JP)

( * ) Notice: Subject to any disclaimer, the term of this patent is extended or adjusted under 35 U.S.C. 154(b) by 1009 days.

(21) Appl. No.: 11/811,825

(22) Filed: Jun. 12, 2007

(65) Prior Publication Data

US 2007/0297025 A1 Dec. 27, 2007

(30) Foreign Application Priority Data

Jun. 26, 2006 (JP) ................................. 2006-175013

(51) Int. Cl.
*H04N 1/04* (2006.01)
(52) U.S. Cl. ......... 358/482; 358/483; 358/463; 358/476
(58) Field of Classification Search .................. 358/456, 358/458, 463, 482, 483, 476; 382/274, 275, 382/254, 276; 345/87, 98, 100, 204, 77; 348/673, 374, 222.1
See application file for complete search history.

(56) References Cited

U.S. PATENT DOCUMENTS 5,960,122 A * 9/1999 Morikawa .................... 382/274
7,242,377 B2 * 7/2007 Mori ............................... 345/77
2007/0097228 A1 * 5/2007 Kuniba ........................ 348/222.1

FOREIGN PATENT DOCUMENTS

| JP | 07-154697 | | 6/1995 |
|---|---|---|---|
| JP | 07154697 | A * | 6/1995 |
| JP | 08-055100 | | 2/1996 |
| JP | 08055100 | A * | 2/1996 |
| JP | 2005-167918 | | 6/2005 |
| JP | 2005167918 | A * | 6/2005 |

OTHER PUBLICATIONS

Melkonian, "Improvement in Performance of A/D Converter by Addition of Dither Signal", [on-line], Feb. 1992, National Semiconductor Co., <URL: WWW.national.com/JPN/an/804.pdf.

* cited by examiner

*Primary Examiner* — Houshang Safaipour
(74) *Attorney, Agent, or Firm* — Robert J. Depke; Rockey, Depke & Lyons, LLC

(57) ABSTRACT

A solid-state image-pickup device including a multiplier configured to perform digital-gain processing for a sensor signal output from an analog-to-digital converter configured to convert an analog signal of an image sensor into a digital signal is provided. The solid-state image-pickup device includes a signal generator configured to generate randomly distributed signals, and an adder configured to add the randomly distributed signals to at least one signal with step-like discrete gradation, the signal being output from the multiplier.

11 Claims, 6 Drawing Sheets

SOLID-STATE IMAGE-PICKUP DEVICE AND METHOD OF PROCESSING SIGNAL OF SOLID-STATE IMAGE-PICKUP DEVICE

CROSS REFERENCES TO RELATED APPLICATIONS

The present invention contains subject matter related to Japanese Patent Application JP 2006-175013 filed in the Japanese Patent Office on Jun. 26, 2006, the entire contents of which are incorporated herein by reference.

BACKGROUND OF THE INVENTION

1. Field of the Invention

The present invention relates to a solid-state image-pickup device and a method of processing a signal of the solid-state image-pickup device.

2. Description of the Related Art

Some of known image sensors often have the function of performing digital-gain processing by multiplying a sensor signal that had been subjected to analog-to-digital conversion (hereinafter referred to as AD conversion) by a given set value and the sensor signal. According to the digital-gain processing, multiplication is performed for an input sensor signal in a digital manner and information about the multiplication result is output. Namely, operations performed, so as to achieve the digital-gain processing, are equivalent to those performed, so as to increase the gain of optical-input sensitivity of the image sensor. On the other hand, analog-gain processing has been performed, so as to control an analog signal which is not yet subjected to the AD conversion. However, the digital-gain processing can be performed without concern for analog noise constraints. Therefore, the upper limit of a multiplication set value used for performing the digital-gain processing can be raised, and the area of a digital-gain circuit becomes smaller than that of an analog-gain circuit.

However, according to the digital-gain processing, the multiplication is performed for the sensor signal without errors in the digital manner within an effective bit. Particularly, when a signal with continuous brightness gradation gently fluctuating near the least significant bit (hereinafter referred to as an LSB) is multiplied by the set value, the multiplication result is shown, as step-like discrete gradation. As a result, when the sensor signal is displayed, as an image, a gradation part that should fluctuate gently by nature looks like steps, which makes an unnatural impression on a viewer.

Hereinafter, an example of the above-described problem will be described. FIG. 6 shows the gradation of a sensor output on which a digital gain is not yet superimposed. Further, FIG. 7 shows the gradation of a sensor output on which a four-times digital gain is superimposed. As shown in each of FIGS. 6 and 7, the continuous gradation gently fluctuating near the LSB looks like steps due to the digital-gain processing. According to the above-described example, the sensor data corresponds to a few LSBs and the value thereof is low. However, even though the sensor data corresponds to a few thousand LSBs and the value thereof is high, the continuous gradation gently fluctuating near the LSB looks like steps, as is the case with the above-described example.

There have been introduced methods of making a step-like part of an image generated by a signal output from an A/D converter smooth. For example, where an A/D converter provided in an acoustic device, an acoustic-measuring instrument, and so forth is used, a dither signal such as a white noise is added, as disclosed in "Leon Melkonian, "Improvement in Performance of A/D converter by Addition of Dither Signal", [online], February 1992, National Semiconductor Co., Ltd. [searched on Mar. 7, 2006], the Internet <URL: www.national.com/JPN/an/An-804.pdf-" or the like.

SUMMARY OF THE INVENTION

Thus, when the signal having the continuous gradation gently fluctuating near the LSB is subjected to the digital-gain processing, the continuous gradation gently fluctuating near the LSB looks like steps.

According to the present invention, therefore, when an analog signal having continuous brightness gradation gently fluctuating near the LSB is AD-converted into a signal having step-like discrete gradation, the step-like discrete gradation is processed into smoothly fluctuating gradation.

A solid-state image-pickup device according to an embodiment of the present invention has a multiplier configured to perform digital-gain processing for a sensor signal output from an analog-to-digital converter configured to convert an analog signal of an image sensor into a digital signal. The solid-state image-pickup device includes a signal generator configured to generate randomly distributed signals, and an adder configured to add the randomly distributed signals to at least one signal with step-like discrete gradation, the signal being output from the multiplier.

The above-described solid-state image-pickup device includes the adder configured to add the randomly distributed signals to the at least one step-like discrete gradation signal output from the multiplier. Therefore, the gradation of a signal output from the adder fluctuates smoothly.

A solid-state image-pickup device according to another embodiment of the present invention includes a bit-shift circuit configured to perform digital-gain processing for a sensor signal output from an analog-to-digital converter configured to convert an analog signal of an image sensor into a digital signal, a signal generator configured to generate randomly distributed signals, and a bit-insertion circuit configured to insert the randomly distributed signals into at least one signal with step-like discrete gradation, the signal being output from the bit-shift circuit.

The above-described solid-state image-pickup device includes the bit-insertion circuit configured to insert the randomly distributed signals into the at least one step-like discrete gradation signal output from the bit-shift circuit. Therefore, the gradation of a signal output from the bit-insertion circuit fluctuates smoothly.

According to another embodiment of the present invention, there is provided a method of processing a signal of a solid-state image-pickup device configured to perform digital-gain processing for a sensor signal, where the sensor signal is obtained by converting an analog signal of an image sensor into a digital signal and output. The method includes the step of adding randomly distributed signals generated by using the sensor signal, as a seed, to at least one signal with step-like discrete gradation, the signal being generated through the digital-gain processing.

According to the above-described method, the randomly distributed signals generated by using the sensor signal, as the seed, are added to the signal corresponding to the step-like discrete gradation that occurs due to the digital-gain processing. Therefore, the gradation of a signal output after the addition fluctuates smoothly.

According to the above-described solid-state image-pickup device, the randomly distributed signals are added to the at least one step-like discrete gradation signal output from the multiplier, so that the gradation of the signal output from the adder fluctuates smoothly. Subsequently, a gradation part that fluctuates gently by nature looks natural.

According to the above-described solid-state image-pickup device, the randomly distributed signals are inserted into the at least one step-like discrete gradation signal output from the bit-shift circuit. Subsequently, the gradation of the signal output from the bit-insertion circuit fluctuates smoothly, so that the gradation part that fluctuates gently by nature looks natural. Further, since specifications of the digital-gain processing are limited, the bit-shift circuit is used in place of the multiplier and the bit-insertion circuit is used in place of the adder. Subsequently, the circuit scale can be significantly reduced.

According the above-described method of processing the signal of the solid-state image-pickup device, the randomly distributed signals generated by using the sensor signal, as the seed, are added to the at least one signal generated through the digital-gain processing, the signal corresponding to the step-like discrete gradation. Therefore, the gradation of the signal output after the addition is performed fluctuates smoothly, so that the gradation part that fluctuates gently by nature looks natural.

DESCRIPTION OF THE PREFERRED EMBODIMENTS

Figure 1:
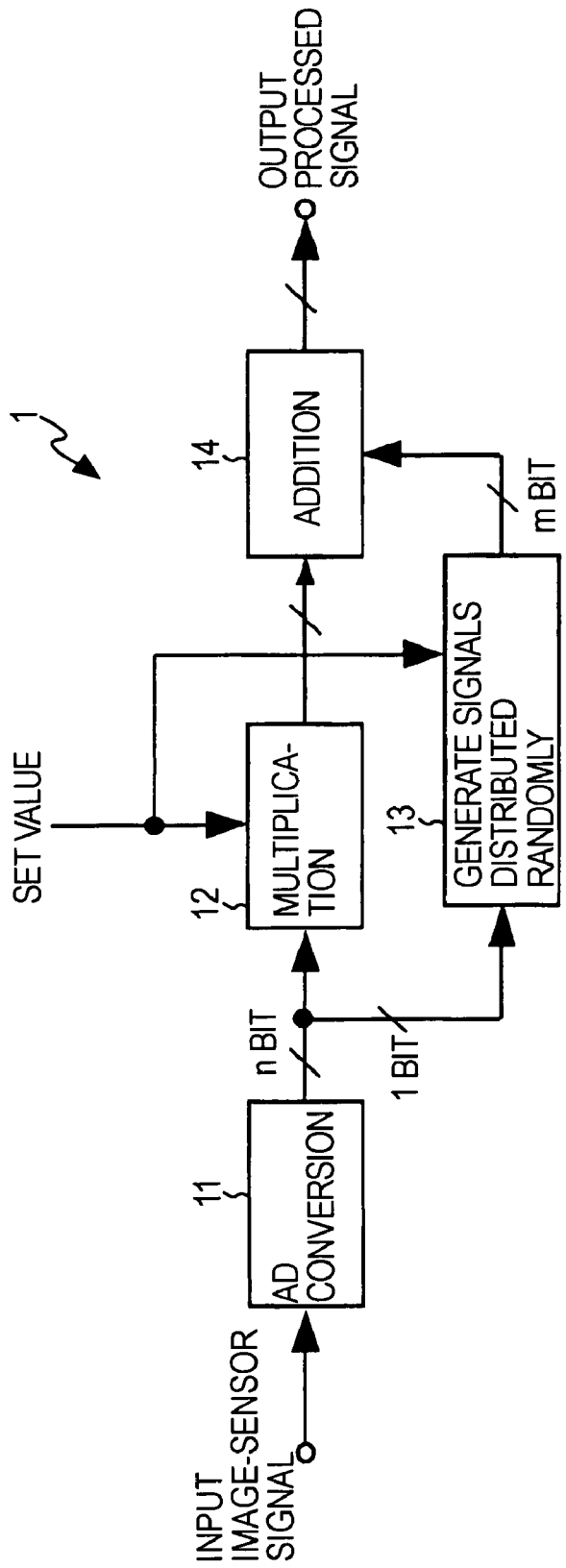
FIG. 1 is a block diagram illustrating a solid-state image-pickup device and a method of driving the solid-state image-pickup device according to a first embodiment of the present invention.

FIG. 1 is a block diagram illustrating a solid-state-image-pickup device 1 and a method of driving the solid-state-image-pickup device 1 according to a first embodiment of the present invention. FIG. 1 shows a digital-gain-processing part of the solid-state image-pickup device 1 including an image sensor or the like.

As shown in FIG. 1, the solid-state image-pickup device 1 includes an analog-to-digital converter (hereinafter referred to as AD converter) 11 provided, so as to convert an analog-sensor signal into an n-bit digital signal, the analog-sensor signal being read by the image sensor driven in a predetermined manner. Subsequently, an analog-sensor signal input to the AD converter 11 due to an input image-sensor signal is converted into a digital signal and output, as a sensor signal.

Further, the solid-state image-pickup device 1 includes a multiplier 12 configured to digitally multiply the sensor signal output from the AD converter 11 by an input fixed value. Still further, the solid-state image-pickup device 1 includes a signal generator 13 configured to generate randomly distributed signals by using the sensor signal, as a seed, and an adder 14 configured to digitally add the value of a result of the above-described calculation performed by the multiplier 12 to the randomly distributed signals output from the signal generator 13. Namely, the adder 14 adds the value of the randomly distributed signals output from the signal generator 13 to the sensor signal with step-like discrete gradation, the sensor signal being output from the multiplier 12.

Figure 2:
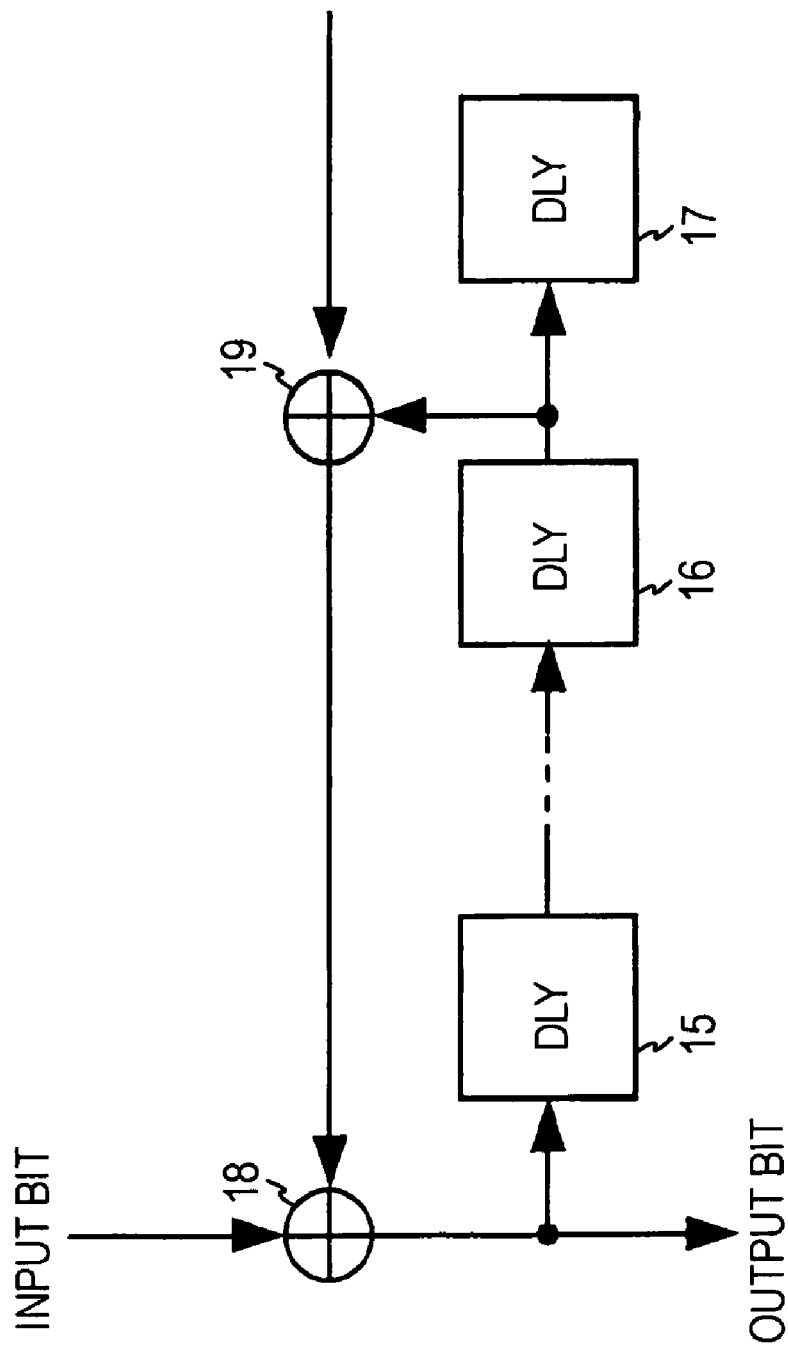
FIG. 2 shows a block of a signal generator, where the block is configured to digitally generate a pseudo-random-bit stream.

The signal generator 13 is a block configured to digitally generate a pseudo-random-bit stream. The signal generator 13 may be mounted in the solid-state-image-pickup device 1 in various manners. In FIG. 2, the signal generator 13 is mounted, as a linear-feedback-shift register (hereinafter referred to as an LFSR), for example.

As shown in FIG. 2, the LFSR outputs exclusive ORs 18 and 19 obtained by adding a one-bit input to arbitrary two points of shift-register groups (DLY 15, DLY 16, and DLY 17). The above-described LFSR is widely used, as a circuit configured to mix an output pseudo-randomly for an input on the basis of a polynomial defined by the circuit of the LFSR. If a fixed value is input to the LFSR in sequence, the LFSR outputs a limited pseudo-random bit stream repeatedly. Subsequently, if the LFSR is used for generating video, the above-described pseudo-random bit stream may become a fixed-pattern noise, which is not desirable. According to the first embodiment, therefore, the least significant bit of the sensor signal that had been subjected to the AD conversion is input to the LFSR, so as to reduce the above-described fixed-pattern noise.

Usually, the least significant bits of the sensor signals that had been subjected to the AD conversion are randomly distributed under the influence of the circuit noise. Therefore, an output of the LFSR, the output being generated upon receiving the least significant bits, has the random characteristic. Further, a direct correlation between the output of the LFSR and the least significant bit of the sensor signal is rarely found. Therefore, it becomes possible to generate the randomly distributed signals.

Figure 3:
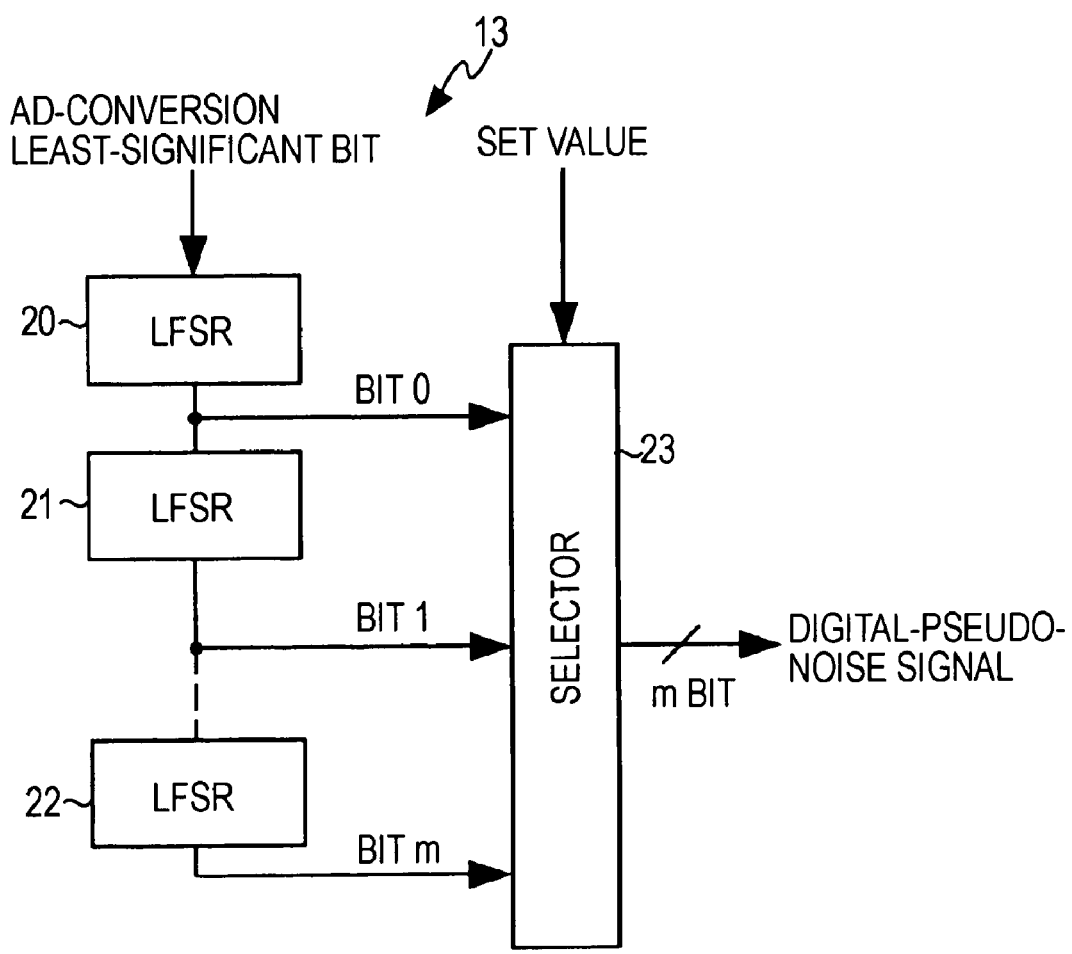
FIG. 3 is a block diagram of the signal generator.

Next, FIG. 3 illustrates an example where a one-bit pseudo-random sequence obtained through the LFSR is expanded to a parallel weighted bit number.

As shown in FIG. 3, each of LFSRs 20, 21, and 22 provided in the signal generator 13 is the LFSR illustrated in FIG. 2. Each of the above-described LFSRs 20, 21, and 22 generates a digital-pseudo-noise signal having a predetermined data amount on the basis of the least significant bit (LSB) of data on the sensor signal that had been subjected to the AD conversion.

The adder 14 shown in FIG. 1 adds the randomly distributed signals obtained through the signal generator 13 to the sensor signal output from the above-described multiplier 12. When the amount of the added randomly distributed signals is larger than that of the sensor signal, the signal-to-noise (S/N) ratio is deteriorated unnecessarily. Therefore, it is preferable that the number of the randomly distributed signals be smaller than that of bits diffused in a step-like manner so that the adder 14 generates an output which prevents the occurrence of step-like gradation near the least significant bit due to digital-gain processing.

For example, when four-times digital-gain processing is performed, the number of bits for addition becomes two or less. Therefore, a selector 23 adds zero to a high-order bit. A two-bit integer and/or a number having a two-bit positive and negative distribution can be mounted, as an amount of the randomly distributed signals. Further, when the sensor signal that had been subjected to the AD conversion and/or the digital-gain processing are output, as predetermined continuous fully-coded signals, at the time where the sensor signal is saturated, for example, it is often preferable that an output circuit according to the first embodiment output fully coded signal. In that case, it is preferable to add the function of detecting an input to the output circuit and calculating a predetermined value to the solid-state image-pickup device 1.

Figure 4:
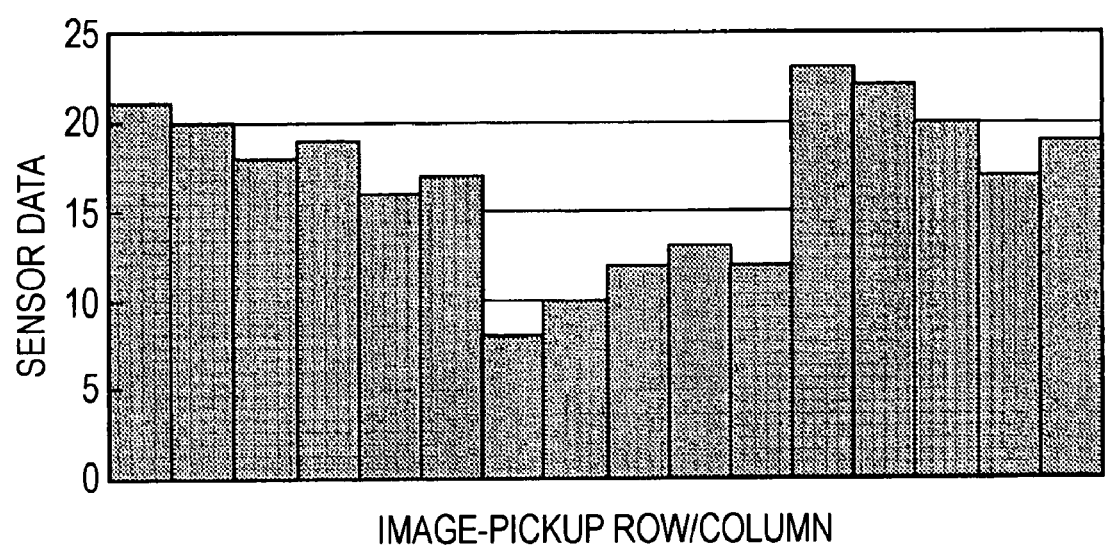
FIG. 4 is a graph illustrating the gradation of a sensor output obtained after digital-gain processing is performed according to the first embodiment.
Figure 6:
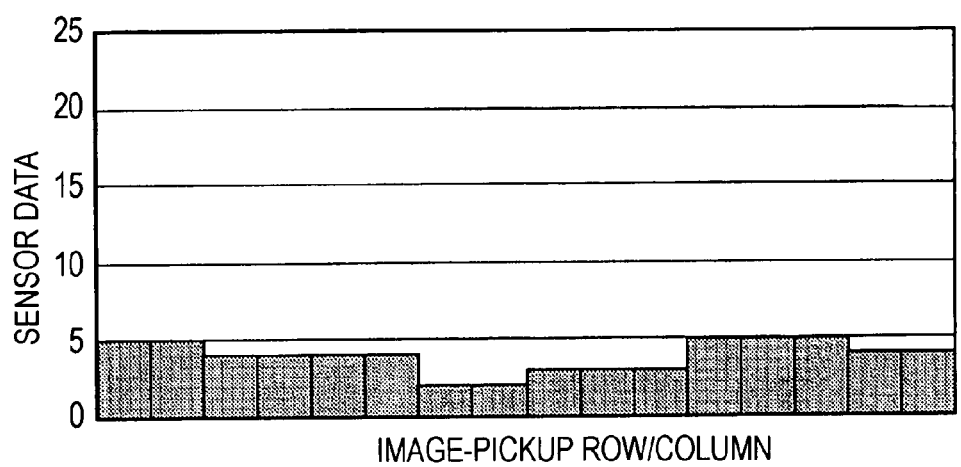
FIG. 6 is a graph illustrating the gradation of a sensor output obtained before the digital-gain processing is performed.

FIG. 4 illustrates an example result of addition of the randomly distributed signals obtained by the signal generator 13 to the sensor signal output from the multiplier 12, where the addition is performed by the adder 14 according to the first embodiment. Here, an input is obtained by performing the four-times digital-gain processing for the gradation of the sensor output on which digital gain is not yet superimposed, the sensor output being illustrated in FIG. 6.

Figure 7:
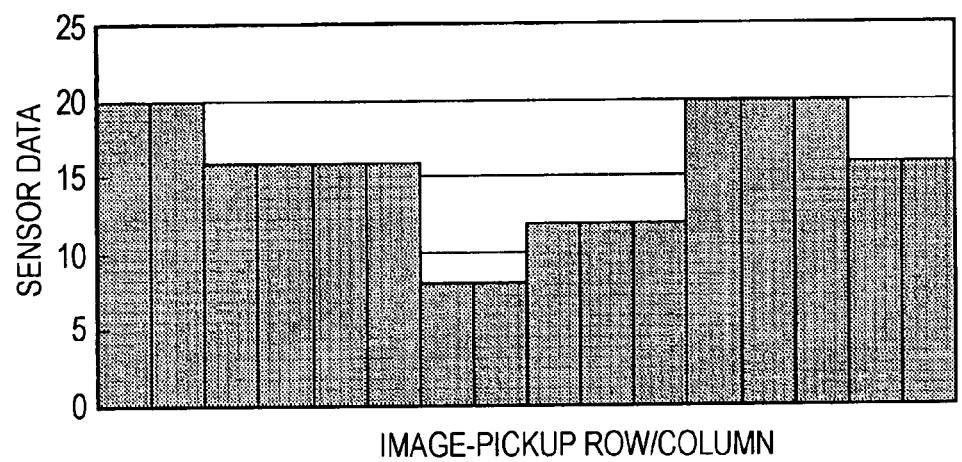
FIG. 7 is a graph illustrating the gradation of a sensor output obtained after the digital-gain processing is performed.

As shown in FIG. 4, the known example step-like gradation shown in FIG. 7, the step-like gradation being generated in the image-pickup-row orientation and/or the image-pickup-column orientation (the image-pickup row/column), is processed into smooth gradation.

According to the first embodiment, the randomly distributed signals that are digitally generated by the signal generator 13 are added to data obtained by performing the digital-gain processing for the sensor signal that had been AD-converted by the AD converter 11. By performing the above-described digital-gain processing, a step-like discrete gradation output is processed into gradation fluctuating smoothly, and the smoothly-fluctuating gradation is output. Usually, pseudo-random data is provided periodically. However, the randomly-distributed signals can be used, so as to solve the problem of the periodical pseudo-random data by using sensor data that had been subjected to the AD conversion. The amount of the randomly distributed signals for addition is changed in an accommodative manner according to a set value of the digital-gain processing so that the S/N ratio is prevented from being deteriorated unnecessarily.

Figure 5:
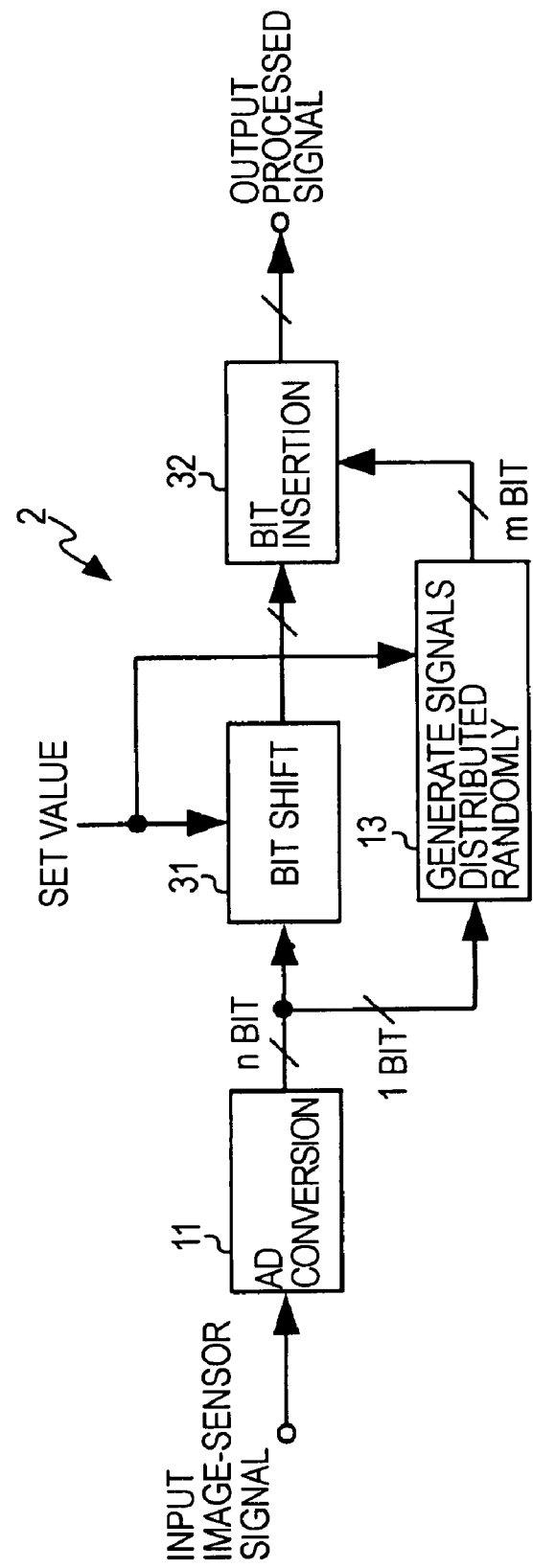
FIG. 5 is a block diagram of a solid-state image-pickup device according to a second embodiment of the present invention.

FIG. 5 is a block diagram illustrating a solid-state image-pickup device 2 and a method of driving the solid-state image-pickup device 2 according to a second embodiment of the present invention. FIG. 5 shows a digital-gain-processing part of the solid-state image-pickup device 2 including an image sensor or the like.

As shown in FIG. 5, the solid-state image-pickup device 2 includes the AD converter 11 provided, so as to convert an analog-sensor signal into the n-bit digital signal, the analog-sensor signal being read by the image sensor driven in a predetermined manner. Subsequently, an analog-sensor signal input to the AD converter 11 due to the image-sensor-signal input is converted into the digital signal and output, as the sensor signal.

Further, the solid-state image-pickup device 2 includes a bit-shift circuit 31 configured to perform bit sifting for the sensor signal output from the AD converter 11 in the most-significant-bit (MSB) direction and insert zero onto the least-significant-bit (LSB) side which becomes vacant, as a set-value input. Still further, the solid-state image-pickup device 2 includes the signal generator 13 configured to generate the randomly distributed signals by using the sensor signal, as the seed, and a bit-insertion circuit 32 configured to insert the randomly distributed signals output from the signal generator 13 into a bit in which zero is inserted, as the output of the bit-shift circuit 31. Namely, all the bit-insertion circuit 32 has to do is to calculate an OR by every bit. Subsequently, since only zero is inserted onto the LSB side when the digital-gain function is used, the bit-insertion circuit 32 does not have to do calculations, so as to perform the signal addition.

The signal generator 13 may use the LFSR illustrated in FIG. 2, for example. In that case, the LFSR may have the configuration illustrated in FIG. 3.

The second embodiment is effective when the specifications of the digital-gain function correspond to two raised to the n-th power, such as two times and four times. Further, contrasted with the first embodiment, the multiplier and/or the adder requiring a large circuit scale and a large area is not used in the second embodiment, as the digital circuit. Namely, the second embodiment can be achieved by using a digital circuit generated on a reduced scale. The circuit scale is determined on the basis of the number of bits for processing of the sensor signal. For example, the circuit scale may be one-tenth of that used in the first embodiment.

The first and second embodiments may be used for a complementary-metal-oxide-semiconductor (CMOS) image sensor onto which the AD converter, the multiplier, the adder, the signal generator, the bit-shift circuit, the bit-insertion circuit, and so forth can be mounted. However, the AD converter, the multiplier, the adder, the signal generator, the bit-shift circuit, the bit-insertion circuit, and so forth can be mounted onto a charge-coupled device (CCD) and/or a different chip receiving an analog output of the CMOS image sensor.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state image-pickup device including a multiplier configured to perform digital-gain processing for a sensor signal output from an analog-to-digital converter configured to convert an analog signal of an image sensor into a digital signal, the solid-state image-pickup device comprising:
    a signal generator configured to generate randomly distributed signals; and
    an adder configured to add the randomly distributed signals to at least one signal output from the multiplier with step-like discrete gradation.

2. The solid-state image-pickup device according to claim 1, wherein the signal generator includes a linear feedback shift register.

3. The solid-state image-pickup device according to claim 1, wherein the signal generator uses the sensor signal, as a seed, so as to generate the randomly distributed signals.

4. A solid-state image-pickup device comprising:
    a bit-shift circuit configured to perform digital-gain processing for a sensor signal output from an analog-to-digital converter configured to convert an analog signal of an image sensor into a digital signal;
    a signal generator configured to generate randomly distributed signals; and
    a bit-insertion circuit configured to insert the randomly distributed signals into at least one signal with step-like discrete gradation, the signal being output from the bit-shift circuit.

5. A method of processing a signal of a solid-state image-pickup device configured to perform digital-gain processing for a sensor signal, where the sensor signal is obtained by converting an analog signal of an image sensor into a digital signal and output, the method comprising the step of:
    adding randomly distributed signals generated by using the sensor signal, as a seed, to at least one signal with step-like discrete gradation, the signal being generated through the digital-gain processing.

6. The solid-state image-pickup device according to claim 1, wherein the signal generator receives a least significant bit of the converted digital signal as an input.

7. The solid-state image-pickup device according to claim 4, wherein the signal generator receives a least significant bit of the converted digital signal as an input.

8. The method of processing a signal of a solid-state image-pickup device according to claim 5, wherein a signal generator that generates the randomly distributed signals receives a least significant bit of the converted digital signal as an input.

9. The solid-state image-pickup device according to claim 1, wherein the signal generator receives a least significant bit of the converted digital signal as an input and a gain multiplier value.

10. The solid-state image-pickup device according to claim 4, wherein the signal generator receives a least significant bit of the converted digital signal as an input and a gain multiplier value.

11. The method of processing a signal of a solid-state image-pickup device according to claim 5, wherein a signal generator that generates the randomly distributed signals receives a least significant bit of the converted digital signal as an input and a gain multiplier value.

* * * * *